(12) United States Patent
Chang et al.

(10) Patent No.: US 9,639,962 B2
(45) Date of Patent: May 2, 2017

(54) APPARATUS AND METHOD OF ENCODING AND DECODING IMAGE FILES WITH ANIMATION DATA

(71) Applicant: Samsung Electronics Co., Ltd., Gyeonggi-do (KR)

(72) Inventors: Won-Suk Chang, Gyeonggi-do (KR); Do-Hyeon Kim, Gyeonggi-do (KR); Jung-Rim Kim, Gyeonggi-do (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 176 days.

(21) Appl. No.: 13/770,613

(22) Filed: Feb. 19, 2013

(65) Prior Publication Data

US 2013/0215151 A1 Aug. 22, 2013

(30) Foreign Application Priority Data

Feb. 16, 2012 (KR) .................. 10-2012-0015607

(51) Int. Cl.
*G06T 9/00* (2006.01)
*G06T 11/60* (2006.01)
*G11B 27/034* (2006.01)
*G11B 27/30* (2006.01)
*H04N 19/70* (2014.01)
*H04N 19/20* (2014.01)
*H04N 19/27* (2014.01)

(52) U.S. Cl.
CPC ............... *G06T 9/00* (2013.01); *G06T 11/60* (2013.01); *G11B 27/034* (2013.01); *G11B 27/3027* (2013.01); *H04N 19/20* (2014.11); *H04N 19/27* (2014.11); *H04N 19/70* (2014.11)

(58) Field of Classification Search
CPC ................................. G06T 9/00; G06T 11/60
USPC .......................................................... 345/636
See application file for complete search history.

(56) References Cited

U.S. PATENT DOCUMENTS

| | | | |
|---|---|---|---|
| 2003/0202212 A1* | 10/2003 | Burgess | G06K 9/00456 358/1.18 |
| 2004/0160445 A1* | 8/2004 | Whatmough | 345/473 |
| 2007/0292035 A1* | 12/2007 | Lee et al. | 382/232 |
| 2009/0027400 A1* | 1/2009 | Marggraff | G06F 3/03545 345/473 |
| 2011/0102616 A1 | 5/2011 | Migiyama et al. | |

FOREIGN PATENT DOCUMENTS

KR   1020040062496   7/2004

* cited by examiner

*Primary Examiner* — Vu Nguyen
(74) *Attorney, Agent, or Firm* — The Farrell Law Firm, P.C.

(57) ABSTRACT

An apparatus and method for encoding an image file is provided. The method includes generating an animation object according to a user input; generating animation data including the animation object; generating image data that is reproducible independently from the animation data; generating an integrated image file, which includes the image data and the animation data; and storing the generated integrated image file in a memory.

12 Claims, 12 Drawing Sheets

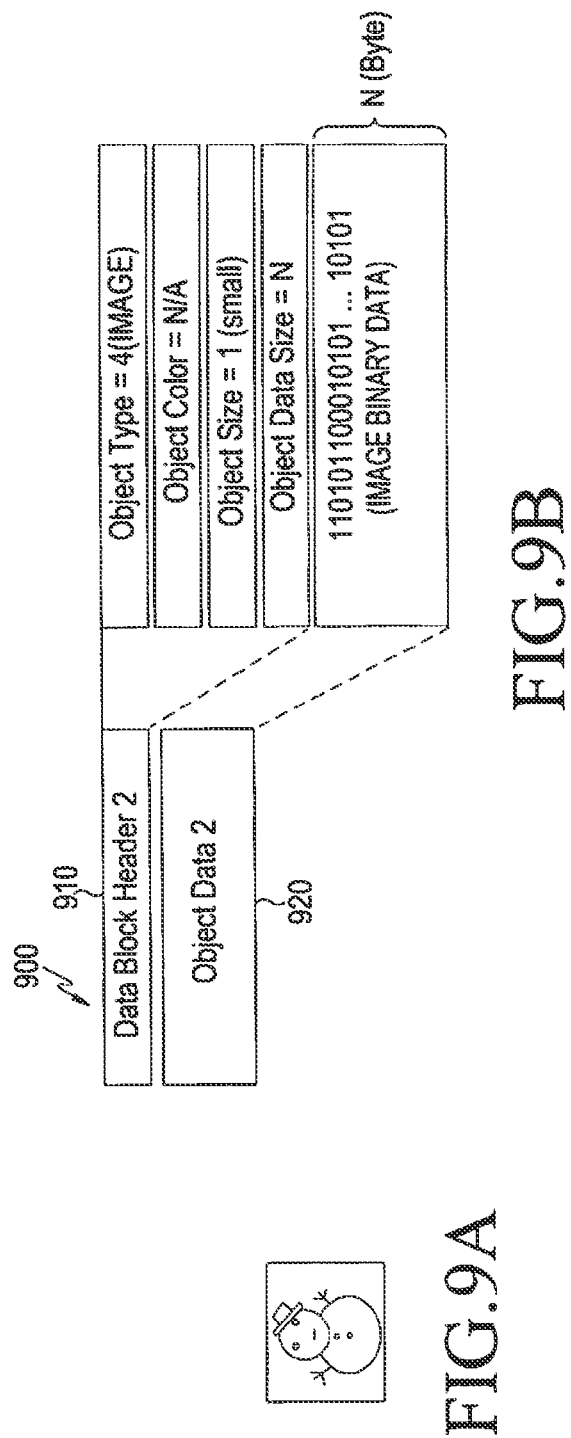

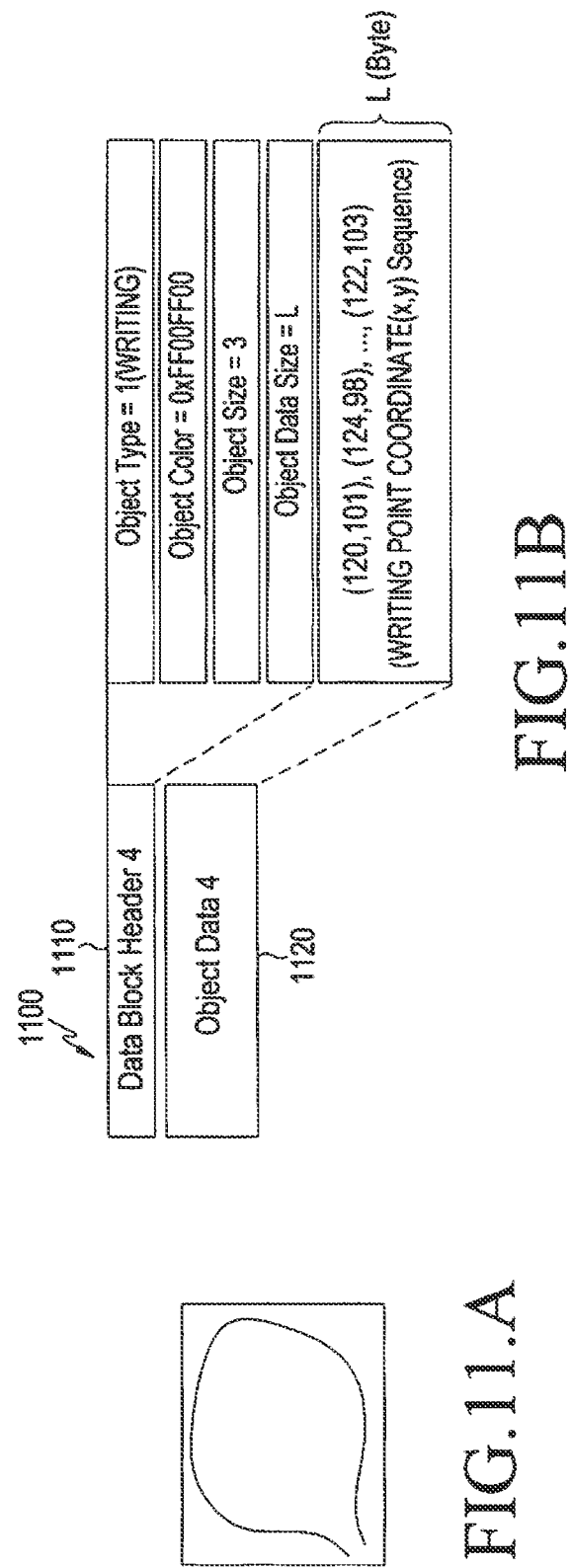

1200

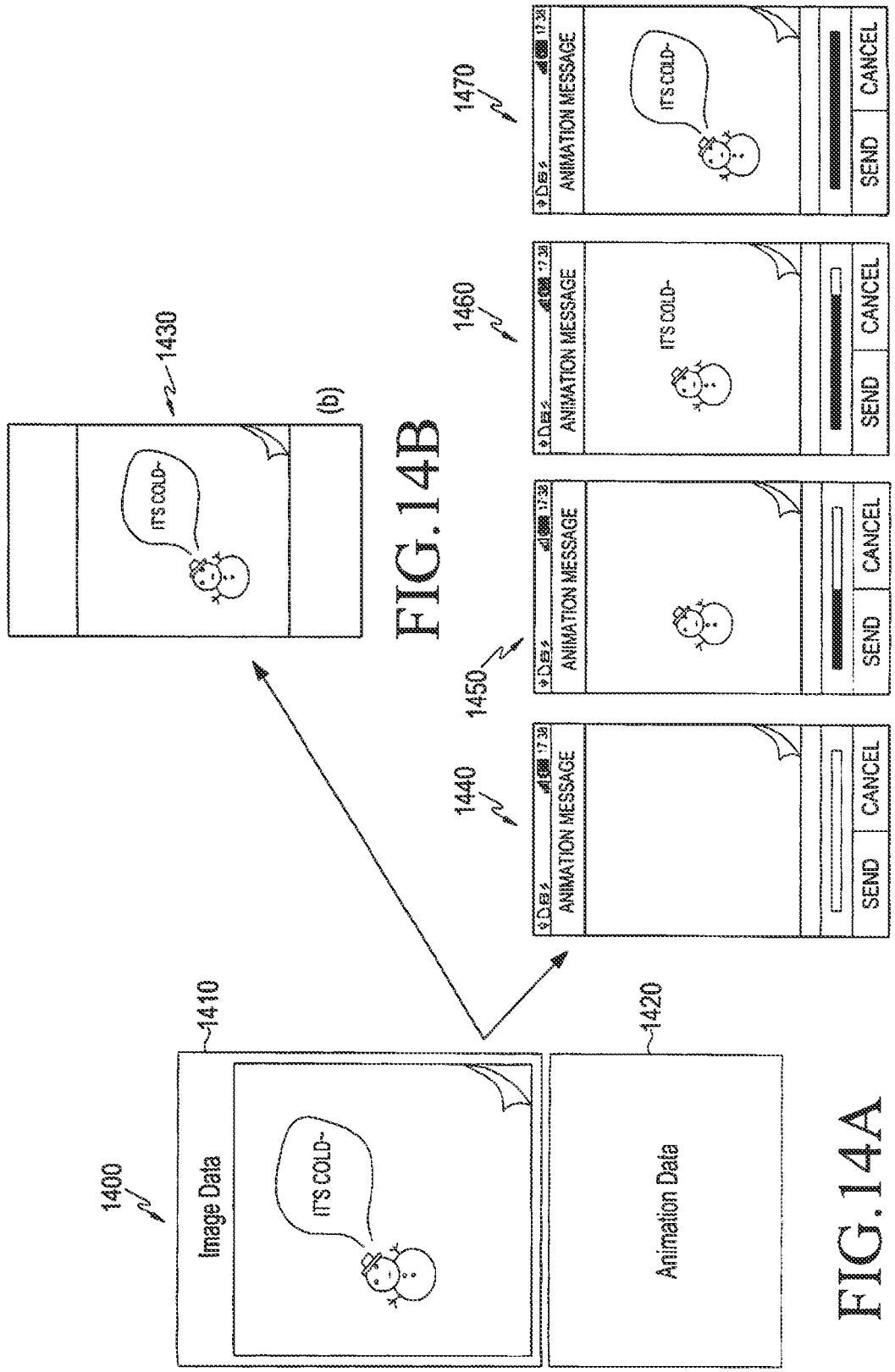

APPARATUS AND METHOD OF ENCODING AND DECODING IMAGE FILES WITH ANIMATION DATA

PRIORITY

This application claims priority under 35 U.S.C. §119(a) to Korean Application Serial No. 10-2012-0015607, which was filed in the Korean Intellectual Property Office on Feb. 16, 2012, the entire content of which is hereby incorporated by reference.

BACKGROUND OF THE INVENTION

1. Field of the Invention

The present invention relates generally to an apparatus and method of encoding and decoding an image file, and more particularly, to an apparatus and method of adding, storing, and using animation data in an image file, regardless of the type (e.g., JPEG, PNG, GIF, etc.) of the image file.

2. Description of the Related Art

Image files, such photos or drawings, have various formats (i.e., data structures) and extensions. For example, the various formats (and extensions) of the image files include Bitmap (*.BMP, *.RLE), Joint Photographic Experts Group (JPEG) (*.JPG), Compuserve GIF (*.GIF), PNG (*.PNG), Photoshop (*,PSD, *.PDD), TIFF (*.TIF), Acrobat PDF (*.PDF), RAW (*.RAW), Illustrator (*.AI), Illustrator, Photoshop EPS (*.EPS), Amiga IFF (*.IFF), FlaschPix (*.FPX), Filmstrip (*.FRM), PCX (*.PCX), PICT File (*.PCT, *TIC), Pixar (*.PXR), Scitex (*.SCT), and Targa (*.TGA, *.VDA, *.ICB, *.VST).

Often, an image file includes image information and user information or additional information related to an image. However, a conventional additional information added to the image file is limited to the user information or image meta information, and an application of the additional information is limited to classifying and searching an image.

An animation file has a format and an extension, which are different from those of conventional still image files, and can be reproduced only by a specific application. As a result, when a multimedia apparatus of a user cannot support such a format, inconvenience is caused in that a content of the animation file cannot be identified.

SUMMARY OF THE INVENTION

Accordingly, the present invention is designed to partially solve, alleviate, or remove at least one of problems and/or disadvantages related to the prior art, and to provide at least the advantages described below.

An aspect of the present invention is to provide new multimedia that is capable of adding animation data to an image file to be stored, regardless of a format (JPEG, PNG, Compuserve GIF, etc.) of the image file, and decoding the animation data added to the image file, such that the image and the animation are independently reproducible.

In accordance with an aspect of the present invention, a method of encoding an image file is provided. The method includes generating an animation object; generating image data that is reproducible independently from the animation data; generating an integrated image file, which includes the image data and the animation data; and storing the generated integrated image file in a memory.

In accordance with another aspect of the present invention, a method of decoding an image file is provided. The method includes determining whether an image file retrieved from a memory is an integrated image file including image data and animation data; reproducing the animation data, if the image file is the integrated image file; and reproducing the image data, if the image file is not the integrated image file.

In accordance with another aspect of the present invention, a multimedia apparatus is provided for encoding an image file. The multimedia apparatus includes a controller that generates an animation object according to a user input, generates animation data including the animation object, generates image data that is reproducible independently from the animation data; and generates an integrated image file, which includes the image data and the animation data; and a memory that stores the generated integrated image file.

In accordance with another aspect of the present invention, a multimedia apparatus is provided for decoding an image file. The multimedia apparatus includes a memory that stores an image file; and a controller that determines whether the image file retrieved from the memory is an integrated image file including image data and animation data, reproduces the animation data, if the image file is the integrated image file, and reproduces the image data, if the image file is not the integrated image file.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 9A and 9B illustrate generating a plurality of animation objects according to an embodiment of the present invention;

FIGS. 11A and 11B illustrate generating a plurality of animation objects according to an embodiment of the present invention;

FIGS. 14A to 14C illustrate a reproduction of an integrated image file according to an embodiment of the present invention.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
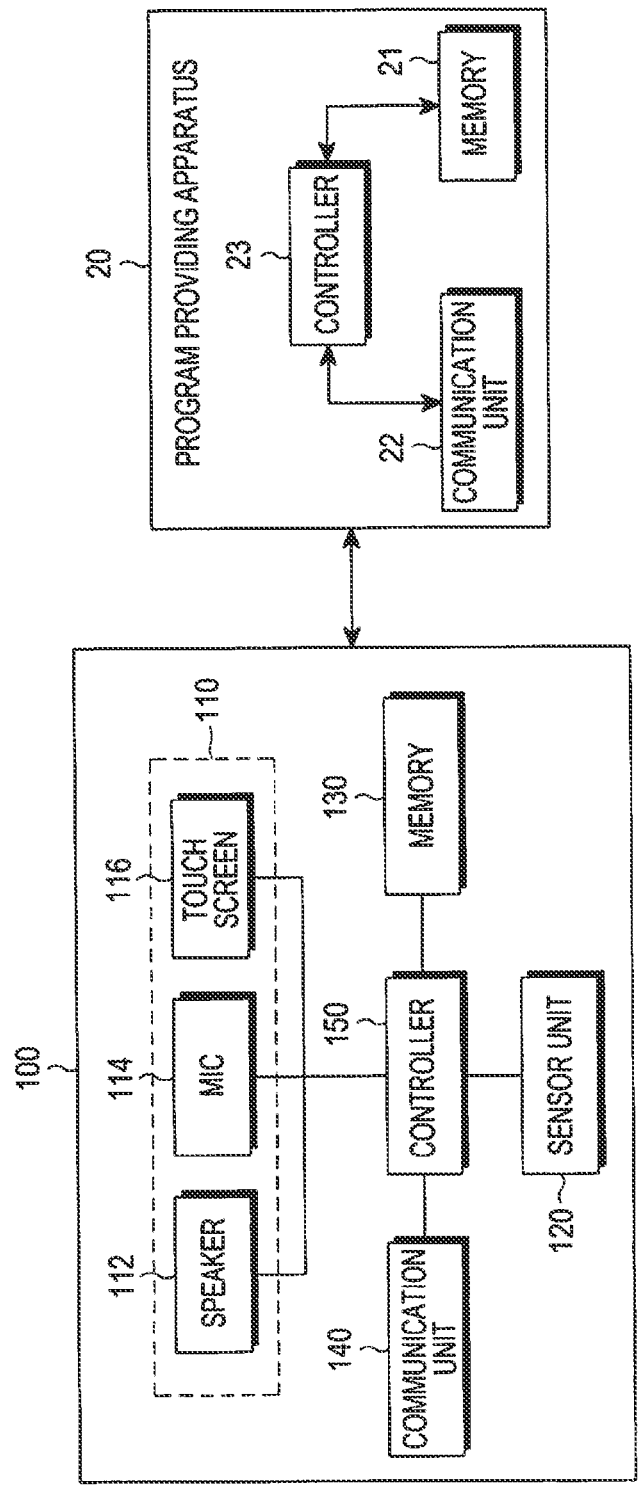
FIG. 1 illustrates a multimedia apparatus and a program providing apparatus according to an embodiment of the present invention.

FIG. 1 illustrates a multimedia apparatus and a program providing apparatus according to an embodiment of the present invention. For example, the multimedia apparatus may be a smart phone, a portable phone, a digital camera, an MP3 player, a TV, a display apparatus, a head unit for vehicles, a notebook, a laptop computer, a tablet Personal Computer (PC), a Personal Medial Player (PMP), a Personal Digital Assistant (PDA), or a navigation apparatus. In FIG. 1, the multimedia apparatus 100 is a mobile communication terminal.

Referring to FIG. 1, the multimedia apparatus 100 includes a user interface 110 including a speaker 112, a microphone (MIC) 114, and a touch screen 116, a controller 150, a sensor unit 120, a memory 130, and a communication unit 140. Although not illustrated in FIG. 1, the multimedia apparatus 100 may further include a key pad including a plurality of buttons, a camera, etc. Herein, the term "unit" refers to a hardware device or a combination of a hardware device and software.

The speaker 112 outputs an audio signal from a voice signal (or voice data) input from the controller 150 and the mic 114 detects a user's voice and outputs an electrical voice signal to the controller 150.

The touch screen 116 displays an image according to an image signal input from the controller 150 and receives user input data to be output to the controller 150. For example, the touch screen 116 includes a display such as a Liquid Crystal Display (LCD), an Organic Light Emitting Diode (OLED), or a Light Emitting Diode (LED), and a touch panel disposed under or above the display unit. The touch panel detects the user input. When a user input mechanism (e.g., a finger, a stylus pen, etc.) presses a surface of the touch screen, the touch panel outputs a detection signal (or touch detection signal) having information about an input location (or coordinate) and/or input status (mouse down, mouse up, mouse movement, etc.). The mouse down is generated when the user input mechanism presses one point of the touch screen 116, the mouse up is generated when the user input mechanism is separated from one point of the touch screen 116, and the mouse movement is generated when the user input mechanism moves while pressing the touch screen 116.

For example, a user touches various executable items displayed on a screen of the touch screen 116 (i.e., surface of the touch interface 116) to execute an application related to the item. The touch screen 116 receives the user input and outputs screens related to a multimedia encoding application and a multimedia decoding application. The touch screen 116 may be replaced with a display unit, and an additional input device (e.g., a touch panel, a keypad including multiple buttons, etc.) may be provided within the multimedia apparatus 100.

The sensor unit 120 detects a location, an orientation, and a motion of the multimedia apparatus 100 and, for example, includes at least one of an acceleration sensor, a gravity sensor, an impact sensor, a Global Positioning System (GPS), a magnetic sensor, and an acceleration sensor.

The memory 130 stores information, data, and files input to an operating system, various applications of the multimedia apparatus 100, or the multimedia apparatus 100 and information, data, and files generated therein.

The communication unit 140 transmits, through a wire or wirelessly, messages, data, and files generated by the controller 150 and receives, through the wire or wirelessly, message, data, and files to be output to the controller 150.

The controller 150 is a central processing apparatus and controls an overall operation of the multimedia apparatus 100 and performs an encoding method and/or decoding method of an image file according to as embodiment of the present invention.

The program providing apparatus 20 includes a memory 21 for storing a program, which includes instructions for the multimedia apparatus 100 to perform encoding or decoding, and update information of the program. The program providing apparatus 20 also includes a communication unit 22 for performing wired or wireless communication with the multimedia apparatus 100, and a controller 23 for transmitting a corresponding program to the multimedia apparatus 100, e.g., automatically or in response to a request from the multimedia apparatus 100.

Figure 2:
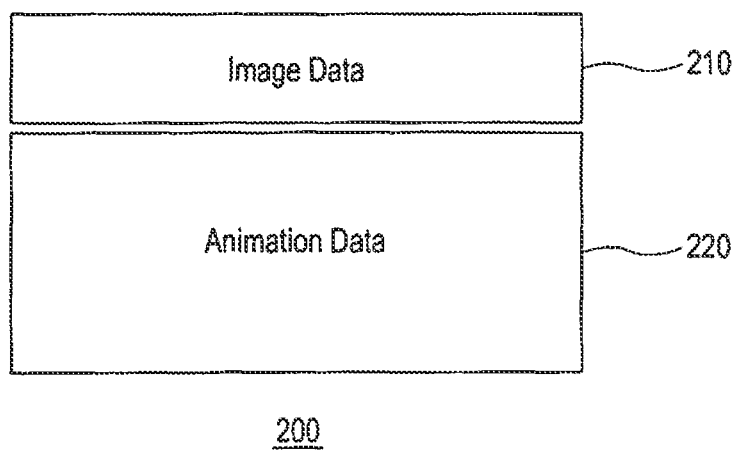
FIG. 2 illustrates a data structure of an integrated image file according to an embodiment of the present invention.
Figure 3:
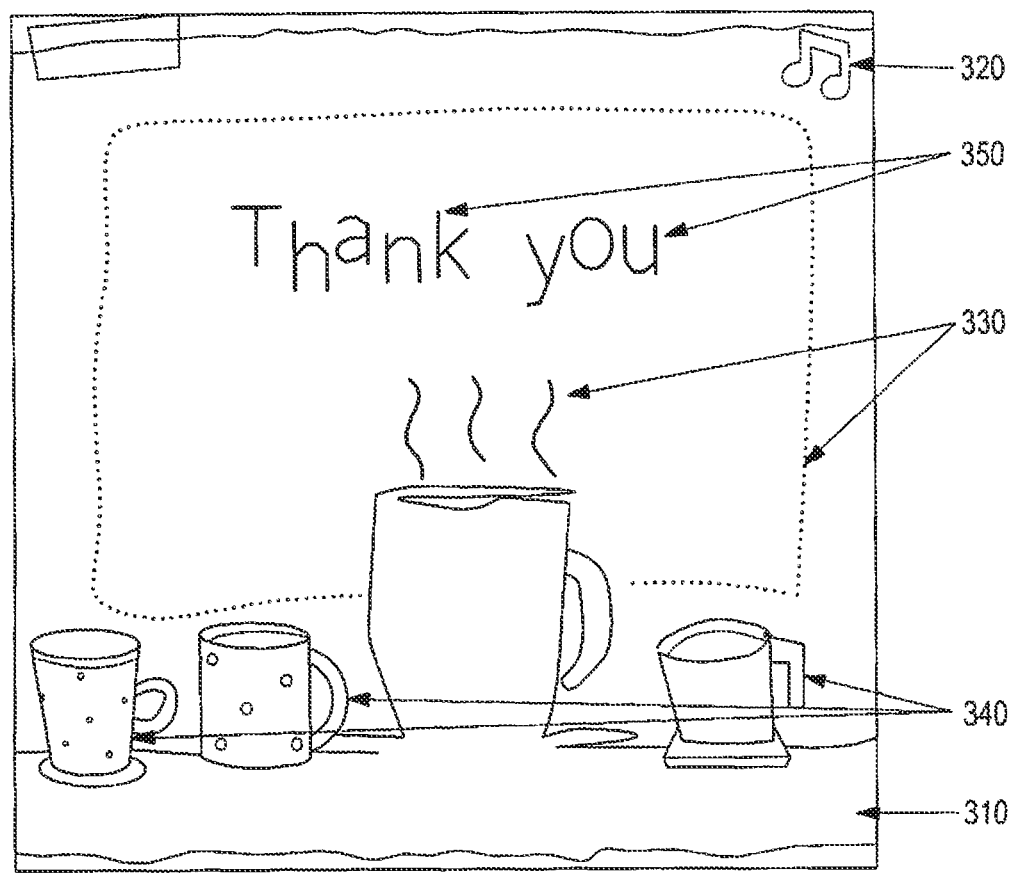
FIG. 3 illustrates animation objects included in animation data according to an embodiment of the present invention.

FIG. 2 illustrates a data structure of an integrated image file according to an embodiment of the present invention, and FIG. 3 illustrates animation objects (hereinafter, referred to merely as "objects") included in animation data according to an embodiment of the present invention.

Referring to FIG. 2, an integrated image file 200 has a filename extension or an extension of a general still image file, and includes still image data 210 (hereinafter, referred to merely as "image data") and animation data 220. The integrated image file 200 may be generated by adding the animation data 220 to a general still image file, and in this case, the still image data 210 may be maintained without change. Also, the integrated image file 200 may include the animation data 220 and the still image data 210 generated based thereon.

As described above, examples image file formats (and extensions) that the image data 210 may have include BMP (*.BMP, *.RLE), JPEG (*.JPG), Compuserve GIF (*.GIF), PNG (*.PNG), Photoshop (*,PSD, *.PDD), TIFF (*.TIF), Acrobat PDF (*.PDF), RAW (*.RAW), Illustrator (*.AI), Illustrator, Photoshop EPS (*.EPS), Amiga IFF (*.IFF), FlaschPix (*.FPX), Filmstrip (*.FRM), PCX (*.PCX), PICT File (*.PCT, *.PIC), Pixar (*.PXR), Scitex (*.SCT), Targa (*.TGA, *.VDA, *.ICB, *.VST).

Referring to FIG. 3, the animation data 220 includes a background object 310 of the animation, a music object 320, a writing object 330, an image object 340, and a character string (or text) object 350. Herein, the object represents data that can be expressed as an image or a sound. The background object 310 represents a background image of the animation, the music object 320 represents music that is output during the reproduction of the animation, the writing object 330 represents an image drawn by the user, the image object 340 represents a still image displayed on the background image, and the character string object 350 represents a character string displayed on the background image.

Figure 4C:
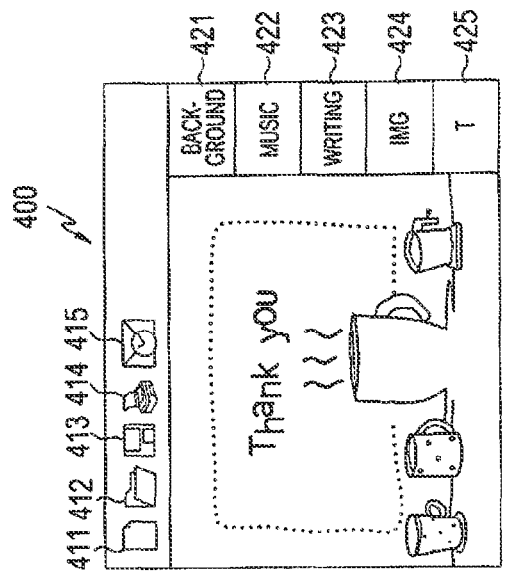
FIGS. 4A to 4C illustrate a method of generating an image file using a multimedia encoding application according to an embodiment of the present invention.
Figure 4B:
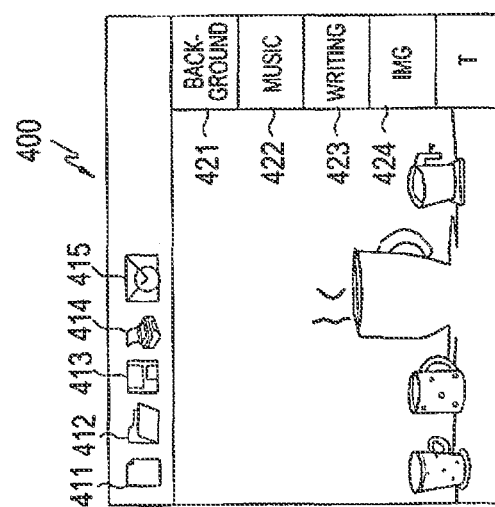
Figure 4A:
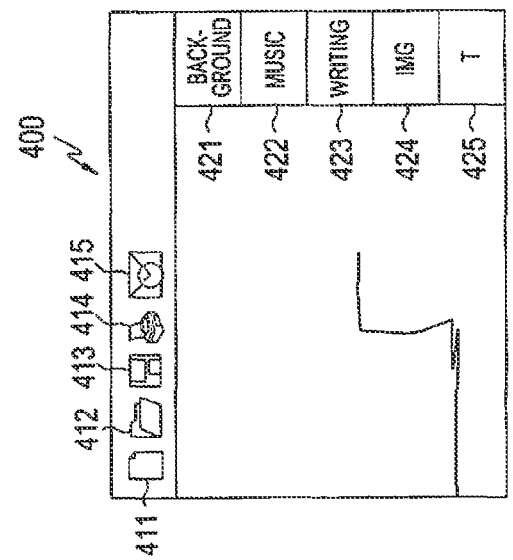

FIGS. 4A to 4C illustrate a method of generating an image file using a multimedia encoding application according to an embodiment of the present invention.

Referring to FIG. 4A, a multimedia encoding application 400 displays a menu 'new image' item 411 related to processing the image file, a menu 'open' item 412, a menu 'store' item 413, a menu 'print' item 414, and a menu 'message' item 415, and although not illustrated, may further display file menu items such as preview, object/frame editing, file merging, etc. The menu 'new image' item 411 is used to generate a new image file. For example, the user may generate animation data file including the animation data by itself or an image file including the animation data and the image data.

The menu 'open' item 412 is used to load the animation data file or the image file stored in the memory, and the menu 'store' item 413 is used to store an edited image file under a default file name or a file name designated by the user. The user may separately store the animation data file, automatically store the image file including the animation data, or manually designate a still image file, to which the animation data is to be merged, to store as an integrated image file.

The menu 'print' item 414 is used to print a currently displayed image file or store the currently displayed image file as a file, and the menu 'message' item 415 is used to transmit the currently displayed image file or the image file stored in the memory in a form of a mail or a Multimedia Messaging Service (MMS) to another multimedia apparatus or a corresponding network. For example, if the user selects the menu 'message' item 415 through a click or touch, a messaging application is executed, and the messaging application displays, to the user, a message writing window to which the image file is attached. A menu item 'preview' is used to reproduce the currently displayed image file, and a menu item 'object editing' is used to set an order of displaying objects, a time of maintaining objects, a reproducing time and/or frame numbers, a switching effect between frames (for example, overlap), or an effect of each object/frame (e.g., gradually increasing luminance). A menu item 'file merging' is used to merge the still image file stored in the memory and the animation data file to generate the integrated image file.

Further, the multimedia encoding application 400 displays a background menu item 421, a music menu item 422, a writing menu item 423, an image menu item 424, and a character string menu item 425, and although not illustrated, may further display object menu items such as a photo, recording a sound, or a recording a video.

The background menu item 421 is used to select the background image that is applied to frames of the animation, the music menu item 422 is used to select a music file to be reproduced during the reproduction of the animation, the writing menu item 423 is used to directly draw a drawing included in the animation by using an input mechanism (finger, stylus pen, etc.), the image menu item 424 is used to select the image stored in the memory to be disposed at a desired location, and the character string menu item 425 is used to directly enter a character string to be included in the animation by using a tool or a soft key pad.

A photo menu item is used to photograph a picture by using a camera and dispose the photographed photo at a desired location, a voice recording menu item is used to record a voice that is to be reproduced together during the reproduction of the animation by using a microphone, and a video recording menu item is used to capture a video by using the camera and dispose the captured video at a desired location.

Referring to FIG. 4A, the user selects the background menu item 421 to select a background image (i.e., a post-it image), which is to apply to the frames of the animation and selects the writing menu item 423 to draw a coffee mug placed on a table.

Referring to FIG. 4B, the user selects the image menu item 424 to dispose three coffee mug images next to both sides of the drawn coffee mug.

Referring to FIG. 4C, the user selects the writing menu item 423 to draw an outer boundary of a rectangular shape that represents a blackboard and selects the text menu item 425 to enter "Thank you" on the drawn blackboard.

Figure 5:
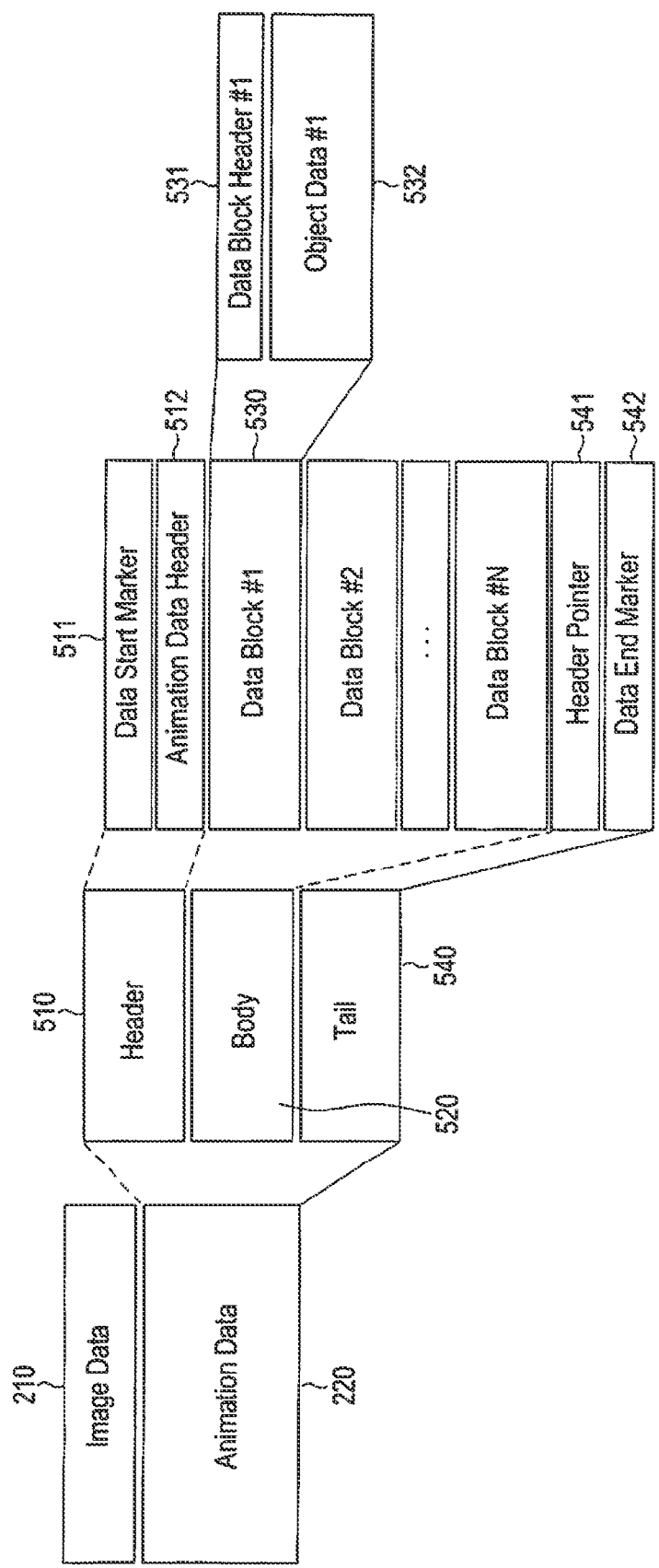
FIG. 5 illustrates a detailed data structure of animation data according to an embodiment of the present invention.

FIG. 5 illustrates a detailed data structure of animation data according to an embodiment of the present invention.

Referring to FIG. 5, the animation data 220 includes a header 510, a body 520, and a tail 540, which are each divided into a plurality of fields or blocks in which corresponding data is written. Hereinafter, an indicator may also be referred to as a marker or a tag.

The header 510 includes a data start marker 511 and an animation data header 512. A data start marker 511 displays a start of the animation data in the integrated image file and may be a combination of a series of codes. Further, the data start marker 511 may have a predetermined data size.

The animation data header 512, which may have a predetermined size, includes information for decoding the animation data, such as version information about an animation data structure, a number of object data blocks included in the body area (hereinafter, referred to as "data block"), and a data size of the body area.

The tail 540 includes a header pointer 541 and a data end marker 542. The header pointer 541 indicates a start location of the header 510 within an entire integrated image file and may include a distance (i.e., a byte number) from a start location of the tail 540 to the start point of the header 510. Further, the header pointer 541 may have a predetermined data size.

The data end marker 542 displays ending of the animation data 220 within the integrated image file and may be a combination of a series of codes. Further, the data end marker 542 may have a predetermined data size.

The body 520 includes at least one data block 530 and may have a variable data size according to a number of the data blocks and a size of data written on each data block. Each data block includes animation object data.

Each data block 530 includes a data block header 531 and an object data 532. The data block header 531 includes metadata about the animation object data, such as an attribute of a corresponding animation object or a size of a corresponding object data 532. The data block header 531 may have a fixed data size. The object data 532 stores information according to a type of a corresponding animation object, and may have a variable data size.

Figure 6:
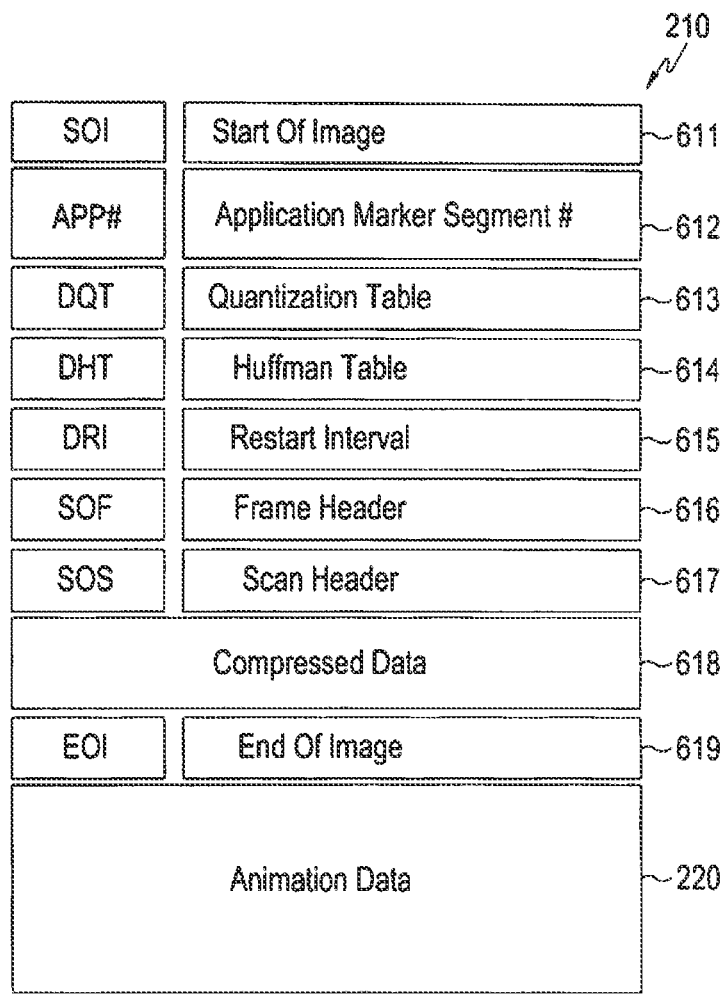
FIG. 6 illustrates a detailed data structure of image data according to an embodiment of the present invention.

FIG. 6 illustrates a detailed data structure of image data according to an embodiment of the present invention. In FIG. 6, the image data 210 is in a JPEG format.

Referring to FIG. 6, the image data 210 includes a Start Of Image (SOI) 611, application data (APP#) 612, Define Quantization Tables (DQT) 613, Define Huffman Tables (DHT) 614, Define Restart Interval (DRI) 615, Start Of Frame (SOF) 616, Start Of Scan (SOS) 617, compressed data 618, and End Of Image (EOI) 619.

The SOI 611 is an indicator, a tag, or a marker indicating a start of the image data. The APP# 612 indicates an application marker segment #, an APP0 JPEG file Interchange format (JFIF) marker is used for identifying, together with the SOI, a JFIF, and additional application markers APP0~APP15 include various application data used as an additional material in the application.

The DQT 613 includes a quantization table, the DHT 614 includes a Huffman table, the DRI 615 defines an interval of a restart marker for recovering damaged image data, the SOF 616 includes information about a size of an image and sampling, and the SOS 617 includes information about a Huffman table that is used by a Y component, a Cb component, and a Cr component. The EOI 619 is an indicator, a tag, or a marker for displaying ending of the image data.

The animation data 220 and the image data 210 may be independently reproduced as two separate two files. Further, the animation data 220 may be added to an end of the general still image file and stored in one file. The user may use a specific decoding application for decoding the animation data to reproduce the image data and/or animation data. Here, the decoding application determines whether the animation data is stored in the end of the image data, and when the animation data exists, the animation data is decoded and reproduced.

In accordance with an embodiment of the present invention, a user is provided with new multimedia in which a still image and an animation are independently combined. However, the decoding application which is incapable of decoding the animation data, decodes only the image data and does not decode the animation data added in the end of the file, such that the image data is normally decoded and reproduced, similar to the general still image file which does not have the animation data.

When a specific frame of the animation (e.g., a final frame of the animation) is used as the image data, the multimedia apparatus capable of decoding the animation data may provide the animation, not a mere still image, and the multimedia apparatus incapable of decoding the animation may decode and reproduce the still image which includes content of the animation, thereby providing advantages in that the content of the animation may be identified as the still image.

Figure 7:
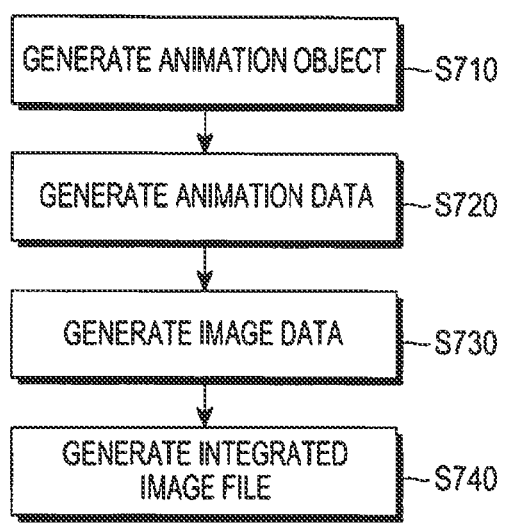
FIG. 7 illustrates a method of encoding an image file according to an embodiment of the present invention.

FIG. 7 illustrates a method of encoding an image file according to an embodiment of the present invention.

Referring to FIG. 7, in step S710, the user generates a plurality of animation objects that make up an animation by using a multimedia encoding application. The multimedia encoding application may structure and store, in the memory, input object data in a form of the data block, each time the user enters the animation object.

In step S720, the multimedia encoding application generates a header and a tail based on a number and a size of generated data blocks and generates the animation data including the data blocks, the header, and the tail. For example, the animation data may be stored in the memory as the animation data file. The animation data may be generated according to a user's 'store' command by using the menu 'store' item. Further, the data blocks included in the body area may be disposed according to an order of inputting the object data by the user and may be subsequently reproduced according to an order of being disposed.

Figures 8A, 8B:
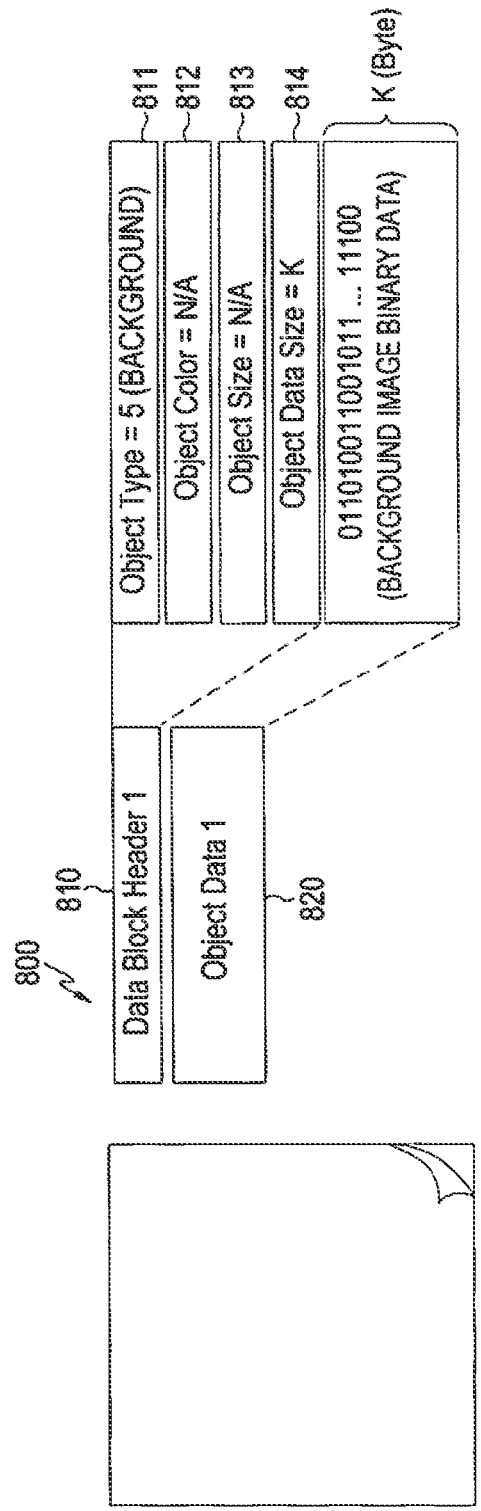
FIGS. 8A and 8B illustrate generating a plurality of animation objects according to an embodiment of the present invention.

FIGS. 8A and 8B illustrate generating a plurality of animation objects according to an embodiment of the present invention.

Referring to FIG. 8A, the user generates the background object by selecting the post-it image, which is the background image to be applied to the frames of the animation by using the background menu item. Specifically, FIG. 8A illustrates the background image and FIG. 8B illustrates a data block 800 including a data block header 810 and an object data 820 corresponding to the background image. The data block header 810 of the data block 800 includes object type information 811, object color information 812, object size (a font size, an image size, etc.) information 813, and object data size (a byte number, a bit number) information 814. The object data 820 includes binary data of a background image of a K byte.

In FIGS. 8A and 8B, the data block header 810 of each data block 800 included in the animation data may include the above information, and the object data 820 of each data block may include binary data, a character string, or a writing point coordinate sequence, which indicates an image or music.

Also, each block header 810 may further include an order of displaying a corresponding object, a time of maintaining the corresponding object, a reproducing time and/or reproduced frame numbers, a switching effect between frames of the corresponding object and previous or subsequent object (for example, overlap), or an effect of the corresponding object/frame (e.g., gradually increasing luminance).

In reproducing the animation, a plurality of the background, writing, image, and character string objects may be displayed to overlap on subsequent frames, and each object may be reproduced gradually over a plurality of frames. For example, for a writing object, an entire writing may be gradually drawn over frames having a number of writing point coordinates, and for an image or character string object, the image or the character string object may be reproduced over multiple frames to be emerged gradually.

Further, an idle frame (for example, continuance of a last frame of a previous object, a preset image, etc.) may be inserted between reproduction of the objects, or each object may be displayed one time or gradually reproduced over multiple frames, or displayed in overlap and repeatedly from an initial display until termination of reproduction of the animation. The block header 810 may include such an object and/or frame reproducing control information.

FIGS. 9A and 9B illustrate generating a plurality of animation objects according to an embodiment of the present invention.

Specifically, FIG. 9A represents a still image, i.e., a snow man, and FIG. 9B represents a data block 900 corresponding to the still image and including a data header 910 and object data 920 of an N byte.

Figures 10A, 10B:
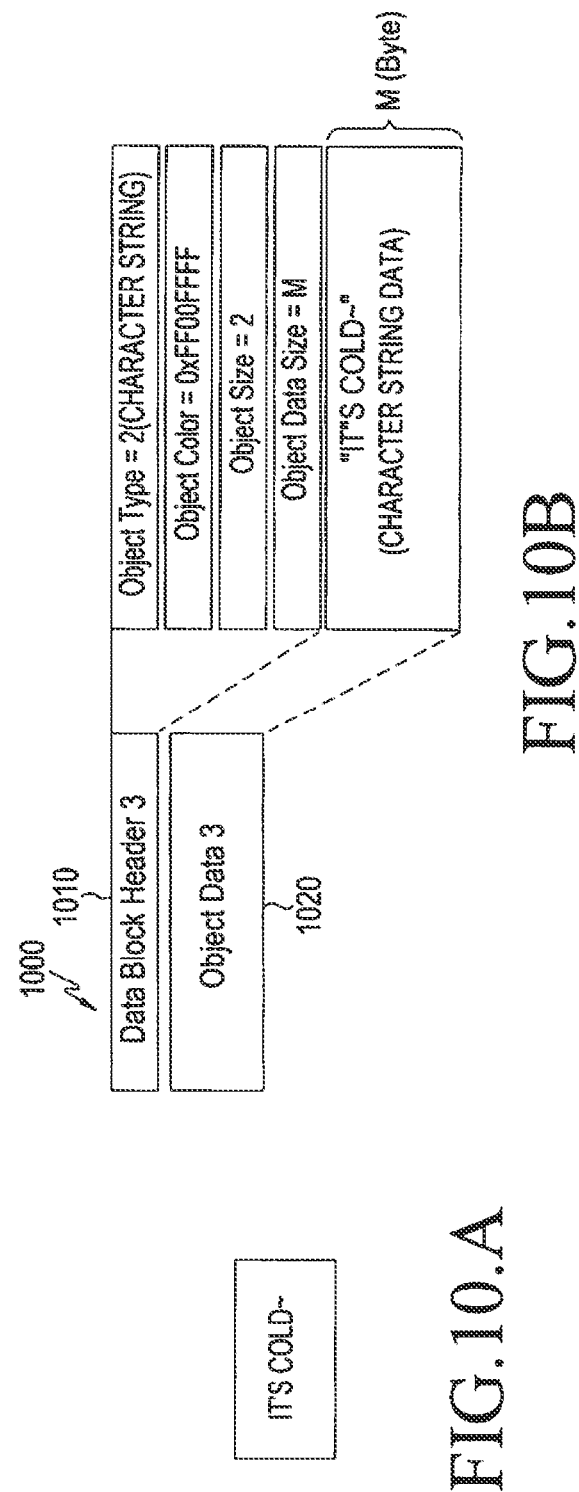
FIGS. 10A and 10B illustrate generating a plurality of animation objects according to an embodiment of the present invention.

FIGS. 10A and 10B illustrate generating a plurality of animation objects according to an embodiment of the present invention.

Referring to FIG. 10A, a character string, i.e., "It's cold", is selected using the character string menu item. FIG. 10B illustrates a data block 1000 corresponding to the character string and including a data block header 1010 and an object data 1020 of an M byte.

FIGS. 11A and 11B illustrate generating a plurality of animation objects according to an embodiment of the present invention.

Specifically, FIG. 11A illustrates a writing image, i.e., a text balloon drawn using the writing menu item, and FIG. 11B illustrates a data block 1100 corresponding to the writing image and including a data block header 1110 and an object data 1120 of an L byte.

Figure 12:
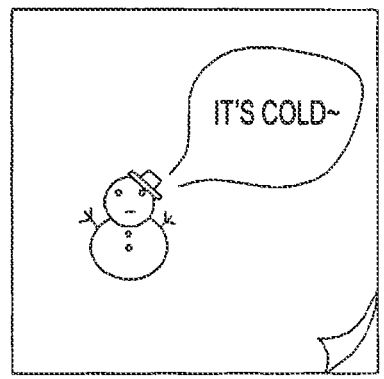
FIG. 12 illustrates an image including a plurality of animation objects according to an embodiment of the present invention.

FIG. 12 illustrates an image including a plurality of animation objects according to an embodiment of the present invention. Specifically, FIG. 12 illustrates a final image frame 1200 of the animation generated according to the animation objects generated in FIGS. 8A, 8B, 9A, 9B, 10A, 10B, 11A, and 11B.

Referring again to FIG. 7, in step S730, the multimedia encoding application generates the image data, for example, by a user's choice or automatically. When generated in response to the user's choice, the user selects a separate still image file stored in the memory or selects a frame from the animation. When the separate still image file is selected by the user, an extension of the integrated image file may be the same as an extension (JPG, PNG, GIF, TIF, BMP, etc.) of the still image file or may have a different extension.

For an automatic generation, the multimedia encoding application generates the image data having a format selected by the user, based on a final frame of the animation. Herein, the multimedia encoding application may generate a preliminary integrated image file having an extension according to the selected format.

In step S740, the multimedia encoding application adds the animation data to the end of the image data to generate and store the integrated image file in the memory.

Figure 13:
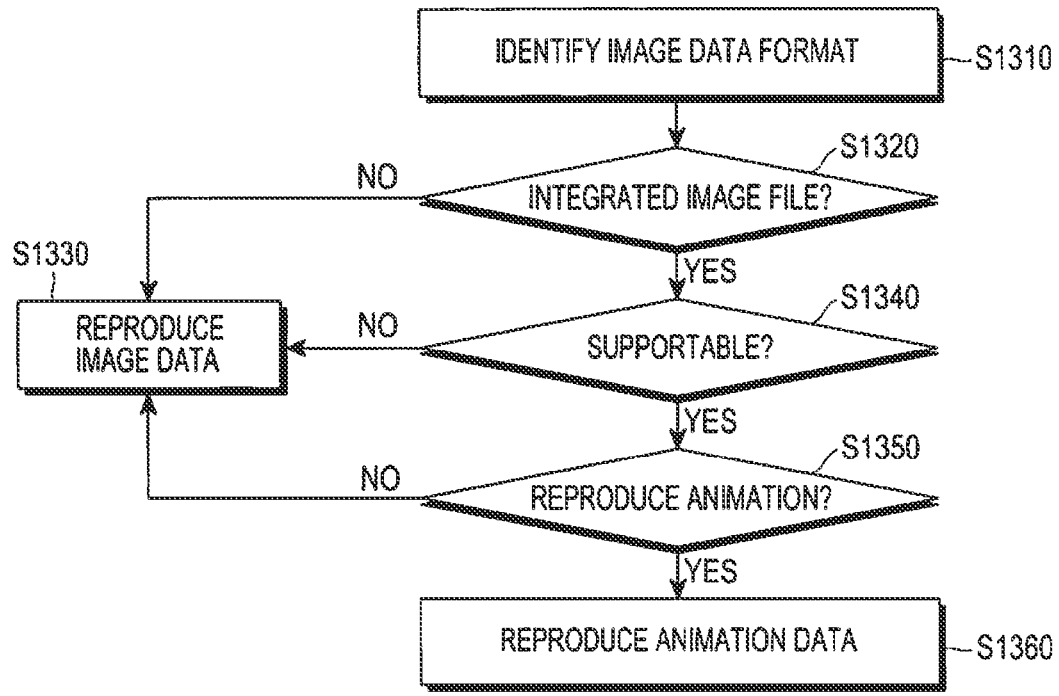
FIG. 13 illustrates a method of decoding an integrated image file according to an embodiment of the present invention.

FIG. 13 illustrates a method of decoding an integrated image file according to an embodiment of the present invention.

Referring to FIG. 13, in step S1310, the multimedia decoding application identifies a format (i.e., data structure) of the image file stored in the memory or the image data within the image file received from an external source through the communication unit. The multimedia decoding application identifies the format of the image data by analyzing the header located at a beginning part of the image file and/or an extension.

In step S1320, the multimedia decoding application identifies whether the image file is an integrated image file, i.e., whether animation data exists after the end marker of the identified format. For example, the multimedia decoding application determines whether the header exists after the end marker of the identified format or searches for the data start marker or the data end marker within the image file.

When the animation data does not exist, i.e., the image file is not an integrated image file, the multimedia decoding application identifies that the image file is the general still image having a corresponding format and reproduces and displays the still image file to the user, in step S1330.

When the animation data exists, i.e., the image file is an integrated image file, the multimedia decoding application analyzes the animation data header to determine whether the animation can be reproduced in step S1340. For example, the multimedia decoding application searches for the data start marker or the data end marker within the image file and detects a location of the animation data header. Herein, when the data start marker is searched, it is determined that a location immediately after the data start marker is a start location of the animation data header, and when the data end marker is searched, the start location of the animation data header is detected through a header pointer written immediately before the data end marker.

The multimedia decoding application decodes the data written on the animation data header to obtain the version information, the size of the entire data written on the body area, and the number of the data block written on the body area.

The multimedia decoding application identifies the version information written on the animation data header field of the animation data to determine whether the format can be decoded, i.e., is supportable.

If the format cannot be decoded, an indication is presented to the user that the decoding is impossible and the image data reproduction in step S1330 is performed.

If the format can be decoded, the multimedia decoding application displays an inquiry to the user as to whether to reproduce the animation in step S1350, and performs the image data reproduction step S1330 or the animation data reproduction step S1360 according to a user input. Step S1350 is an optional, and the animation data reproduction step S1360 may be performed without user verification.

In step S1360, the multimedia decoding application reproduces the animation data to be displayed to the user.

The multimedia decoding application determines a location immediately next to the animation data header as a start location of the body area to sequentially decode the data within the body area in a data block unit.

Herein, the multimedia decoding application reads and stores data written on each data block in the memory. When decoding of all data blocks is completed, the multimedia decoding application reads each data block from the memory in an order stored to generate the animation object and displays each object in a predetermined time interval or continuously, thereby exhibiting an animation effect.

Additionally, when decoding each data block within the body area, the multimedia decoding application identifies information of an animation object type from the data block header and determines whether the object can be decoded. If the object is a type that is not supported by the multimedia decoding application (e.g., support for music output is not available) or the object is impossible to decode (e.g., object is defined in an upper version), or decoding becomes impossible during decoding the object data field, jumping to a next data block is made by referring to a size of the object data field (object data size) such that decoding of a corresponding data block is omitted and decoding is continued. Accordingly, the multimedia decoding application may perform partial decoding of the animation data even when an object of an upper version to a currently supportable version exists or a part of object data has an error. Also, contrary to this, it is possible to decode object data of a lower version, of which partial data required in the current version does not exist within the object data, in the multimedia decoding application of the upper version.

FIGS. 14A to 14C illustrate a reproduction of an integrated image file according to an embodiment of the present invention. Specifically, FIG. 14A illustrates an integrated image file 1400 including image data 1410 and animation data 1420, FIG. 14B illustrates a screen 1430 in which the image data is reproduced by the multimedia decoding application, and FIG. 14C illustrates screens 1440, 1450, 1460, and 1470 in which the animation data is reproduced by the multimedia decoding application in a timely order.

According to the above-described embodiments of the present invention, it is possible to store additional data for the animation, etc., to the image file without being limited by the image format. Therefore, the multimedia decoding application, which supports a file structure suggested by the present invention, may decode the image and also the additional data to create and provide new multimedia in which the image is combined with an animation element such as music, writing, text, etc.

Also, the data structure suggested by the above-described embodiments of the present invention provides version extensibility and compatibility between versions of the data structure.

It should be noted that the above-described embodiments of the present invention may be implemented by hardware or a combination of the hardware and software. The software may be stored in a volatile or non-volatile storage device including a storage device such as a Read-Only Memory (ROM) or a memory such as a Random Access Memory (RAM), a memory chip, or an integrated circuit, and a storage medium such as a Compact Disk (CD), a Digital Versatile Disc (DVD), a magnetic disk, or a magnetic tape which enables an optical or magnetic recording as well as being readable by a machine. It should be understood that the memory is an example of a machine (for example, a computer) readable storage medium suitable for storing a program or programs including instructions that implement exemplary embodiments of the present invention. Therefore, the present invention includes a machine-readable storage medium, which stores a program or programs including codes for implementing a method described by the appended claims. Also, such a program may be electrically transmitted through any medium similar to a communication signal, which is propagated by wire or wirelessly, and the present invention includes equivalents thereof.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of decoding an image file by a multimedia apparatus, the method comprising:
   determining whether an image file retrieved from a memory is an integrated image file including image data and animation data positioned next to the image data, the animation data including a plurality of animation objects;
   reproducing the animation data, if the image file is the integrated image file; and
   reproducing the image data, if the image file is not the integrated image file,
   wherein the plurality of animation objects include a background object, an image object and a writing object, and the image object and the writing object are sequentially reproduced on the background object,
   wherein a plurality of writing points of the writing object are gradually drawn over sequential image frames based on a sequence of writing point coordinates,
   wherein the image data includes an image frame displaying the background object, the image object and the writing object,
   wherein the animation data includes values representing types of the plurality of animation objects and values representing sizes of the plurality of animation objects, and
   wherein the reproducing of the animation data includes:
   identifying, from among the plurality of animation objects, an animation object a type of which is not supported by the multimedia apparatus based on the values representing types of the plurality of animation objects, and
   outputting, from among the plurality of animation objects, a next animation object without outputting the identified animation object based on a size of the identified animation object.

2. The method of claim 1, wherein the plurality of animation objects further includes one of a music object and a character string object.

3. The method of claim 1, wherein the animation data further includes:
   a data start marker that which is positioned at a start of the animation data and indicates the start of the animation data within the integrated image file;
   an animation data header which includes information for decoding the animation data;
   a header pointer which indicates a start location of the animation data header within the integrated image file;
   the plurality of animation objects which is positioned between the animation data header and the header pointer; and
   a data end marker which is positioned at an end of the animation data and indicates the end of the animation data within the integrated image file.

4. The method of claim 1, wherein the animation data is added next to a marker that indicates an end of the image data.

5. A multimedia apparatus for decoding an image file, the multimedia apparatus comprising:
   a memory that stores an image file; and
   a controller that determines whether the image file retrieved from the memory is an integrated image file including image data and animation data positioned next to the image data, reproduces the animation data, if the image file is the integrated image file, and reproduces the image data, if the image file is not the integrated image file,
   wherein the animation data includes a plurality of animation objects,
   wherein the plurality of animation objects include a background object, an image object and a writing object, and the image object and the writing object are sequentially reproduced on the background object,
   wherein a plurality of writing points of the writing object are gradually drawn over sequential image frames based on a sequence of writing point coordinates, and
   wherein the image data includes an image frame displaying the background object, the image object and the writing object,
   wherein the animation data includes values representing types of the plurality of animation objects and values representing sizes of the plurality of animation objects, and
   wherein the multimedia apparatus is configured to:
   identify, from among the plurality of animation objects, an animation object a type of which is not supported by the multimedia apparatus based on the values representing types of the plurality of animation objects; and
   output, from among the plurality of animation objects, a next animation object without outputting the identified animation object based on a size of the identified animation object.

6. The multimedia apparatus of claim 5, wherein the plurality of animation objects further includes one of a music object and a character string object.

7. The multimedia apparatus of claim 5, wherein the animation data further includes:
   a data start marker that which is positioned at a start of the animation data and indicates the start of the animation data within the integrated image file;
   an animation data header which includes information for decoding the animation data;
   a header pointer which indicates a start location of the animation data header within the integrated image file;
   the plurality of animation objects which is positioned between the animation data header and the header pointer; and a data end marker which is positioned at an end of the animation data and indicates the end of the animation data within the integrated image file.

8. The multimedia apparatus of claim 5, wherein the animation data is added next to a marker that indicates an end of the image data.

9. A non-transitory computer readable storage medium for recording a program for executing a method of decoding an image file by a multimedia apparatus, the method comprising:

determining whether an image file retrieved from a memory is an integrated image file including image data and animation data positioned next to the image data, the animation data including a plurality of animation objects;
  reproducing the animation data, if the image file is the integrated image file; and
  reproducing the image data, if the image file is not the integrated image file,
  wherein the plurality of animation objects include a background object, an image object and a writing object, and the image object and the writing object are sequentially reproduced on the background object,
  wherein a plurality of writing points of the writing object are gradually drawn over sequential image frames based on a sequence of writing point coordinates,
  wherein the image data includes an image frame displaying the background object, the image object and the writing object,
  wherein the animation data includes values representing types of the plurality of animation objects and values representing sizes of the plurality of animation objects, and
  wherein the reproducing of the animation data includes:
    identifying, from among the plurality of animation objects, an animation object a type of which is not supported by the multimedia apparatus based on the values representing types of the plurality of animation objects; and
    outputting, from among the plurality of animation objects, a next animation object without outputting the identified animation object based on a size of the identified animation object.

10. The non-transitory computer readable storage medium of claim 9, wherein the plurality of animation objects further includes one of a music object and a character string object.

11. The non-transitory computer readable storage medium of claim 9, wherein the animation data further includes:

a data start marker that which is positioned at a start of the animation data and indicates the start of the animation data within the integrated image file;
  an animation data header which includes information for decoding the animation data;
  a header pointer which indicates a start location of the animation data header within the integrated image file;
  the plurality of animation objects which is positioned between the animation data header and the header pointer; and
  a data end marker which is positioned at an end of the animation data and indicates the end of the animation data within the integrated image file.

12. The non-transitory computer readable storage medium of claim 9, wherein the animation data is added next to a marker that indicates an end of the image data.

* * * * *